US012718595B2

(12) United States Patent
Bonasera et al.

(10) Patent No.: US 12,718,595 B2
(45) Date of Patent: Aug. 25, 2026

(54) AUGMENTING MOTION PLANNING OF AUTONOMOUS AND SEMI-AUTONOMOUS VEHICLES BASED ON OCCLUDED REGIONS

(71) Applicant: GM GLOBAL TECHNOLOGY OPERATIONS LLC, Detroit, MI (US)

(72) Inventors: Stefano Bonasera, Royal Oak, MI (US); Daniel Aguilar Marsillach, Chicagom, IL (US); Rouhollah Sayed Jafari, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 392 days.

(21) Appl. No.: 18/499,479

(22) Filed: Nov. 1, 2023

(65) Prior Publication Data

US 2025/0139991 A1 May 1, 2025

(51) Int. Cl.

*G06V 20/56* (2022.01)
*B60W 60/00* (2020.01)
*G06V 10/82* (2022.01)

(52) U.S. Cl.

CPC ......... *G06V 20/588* (2022.01); *B60W 60/001* (2020.02); *G06V 10/82* (2022.01); *B60W 2554/20* (2020.02)

(58) Field of Classification Search

CPC ... G06V 20/588; G06V 10/82; B60W 60/001; B60W 2554/20

See application file for complete search history.

(56) References Cited

U.S. PATENT DOCUMENTS 12,475,604 B2 * 11/2025 Fidler ........................ G06T 5/60
2019/0101649 A1 * 4/2019 Jensen .................... G01S 17/89
2021/0026355 A1 * 1/2021 Chen ......................... G06T 7/11
2022/0185267 A1 * 6/2022 Beller ............... B60W 30/0956
2022/0254162 A1 * 8/2022 Felemban .............. H04N 7/181
2023/0186479 A1 * 6/2023 Creusot .................. G06V 10/82 701/27
2024/0087333 A1 * 3/2024 Hari ....................... G06V 10/25

OTHER PUBLICATIONS

Leurent, Edouard, et al. "Social Attention for Autonomous Decision-Making in Dense Traffic" Machine Learning for Autonomous Driving Workshop at the 22nd Conference on Neural Information Processing Systems (NeurIPS), 2019.
Vaswani, Ashish, et al. "Attention Is All You Need": 31st Conference on Neural Information Processing Systems (NIPS), 2017.

* cited by examiner

*Primary Examiner* — Qun Shen

(57) ABSTRACT

A system for a vehicle includes sensors that sense surroundings of the vehicle. A perception module generates a map of the surroundings of the vehicle. The map comprises objects around the vehicle. An occlusion computing module computes occluded regions in the map. The occluded regions are regions around the vehicle that are occluded by one or more of the objects around the vehicle. A filtering module filters none, or one or more of the occluded regions from the map. The map comprises a plurality of filtered occluded regions after the filtering. A scoring module scores the filtered occluded regions based on importance of the filtered occluded regions to a trajectory of the vehicle. A motion planning module modifies the trajectory of the vehicle based on importance scores of the filtered occluded regions. A propulsion module propels the vehicle according to the modified trajectory.

20 Claims, 6 Drawing Sheets

AUGMENTING MOTION PLANNING OF AUTONOMOUS AND SEMI-AUTONOMOUS VEHICLES BASED ON OCCLUDED REGIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to autonomous and semi-autonomous vehicles and more particularly to augmenting motion planning of autonomous and semi-autonomous vehicles based on occluded regions.

Autonomous and semi-autonomous vehicles (hereinafter "the vehicles") receive a motion plan from a navigation subsystem in the vehicle. The navigation subsystem utilizes various sensors such as cameras, radar, and Lidar sensors installed in and around the vehicle to augment the motion plan. These sensors scan the environment around the vehicle and supply data of the surroundings of the vehicle to the navigation subsystem. The navigation subsystem uses the data to generate, update, and augment a motion plan for the vehicle. Other subsystems of the vehicle such as the engine control subsystem, transmission subsystem, braking subsystem, steering subsystem, and so on propel the vehicle according to the generated, updated, and augmented motion plan.

SUMMARY

A system for a vehicle comprises a plurality of sensors configured to sense surroundings of the vehicle and a perception module configured to generate a map of the surroundings of the vehicle, where the map comprises objects around the vehicle. The system comprises an occlusion computing module configured to compute occluded regions in the map, where the occluded regions are regions around the vehicle that are occluded by one or more of the objects around the vehicle. The system comprises a filtering module configured to filter out none, or one or more of the occluded regions from the map, where the map comprises a plurality of filtered occluded regions after the filtering. The system comprises a scoring module configured to score the filtered occluded regions based on importance of the filtered occluded regions to a trajectory of the vehicle. The system comprises a motion planning module configured to modify the trajectory of the vehicle based on importance scores of the filtered occluded regions. The system comprises a propulsion module configured to propel the vehicle according to the modified trajectory.

In other features, the motion planning module is configured to select one or more of the filtered occluded regions having importance scores greater than or equal to a threshold, and to modify the trajectory of the vehicle based on the selected filtered occluded regions.

In other features, the scoring module comprises a neural network configured to score the filtered occluded regions. The neural network is trained using a baseline reward component and a second reward component that balances the baseline reward component.

In other features, the second reward component comprises a product of a negative factor and a sum of the importance scores of the filtered occluded regions.

In other features, the scoring module comprises a first plurality of neural networks configured to receive features associated with the trajectory of the vehicle as inputs and to generate first outputs, and a second plurality of neural networks configured to receive features associated with the filtered occluded regions and to generate second outputs. The scoring module is configured to output the importance scores of the filtered occluded regions based on the first outputs and the second outputs.

In other features, the second plurality of neural networks is shared between the filtered occluded regions.

In other features, the second plurality of neural networks is different than the first plurality of neural networks.

In other features, the filtering module is configured to filter out one or more of the occluded regions from the map based on relevance of the occluded regions to the trajectory of the vehicle.

In other features, the filtering module is configured to filter out none, or one or more of the occluded regions from the map based on route, state, and the trajectory of the vehicle; states of moving objects around the vehicle; predictions about the moving objects around the vehicle; and heuristics including the occluded regions that do not intersect the route of the vehicle, size and proximity of the occluded regions relative to the vehicle, and temporal evolution of the occluded regions and the moving objects around the vehicle.

In other features, the occlusion computing module is configured to compute the occluded regions based on data received from a mapping system identifying static objects including buildings and road configuration along a route of the vehicle.

In still other features, a method for a vehicle comprises sensing surroundings of the vehicle, and generating a map of the surroundings of the vehicle, where the map comprises objects around the vehicle. The method comprises computing occluded regions in the map, where the occluded regions are regions around the vehicle that are occluded by one or more of the objects around the vehicle. The method comprises filtering out one or more of the occluded regions from the map, where the map comprises a plurality of filtered occluded regions after the filtering. The method comprises scoring the filtered occluded regions based on importance of the filtered occluded regions to a trajectory of the vehicle. The method comprises modifying the trajectory of the vehicle based on importance scores of the filtered occluded regions. The method comprises propelling the vehicle according to the modified trajectory.

In other features, the method further comprises selecting one or more of the filtered occluded regions having importance scores greater than or equal to a threshold, and modifying the trajectory of the vehicle based on the selected filtered occluded regions.

In other features, the method further comprises scoring the filtered occluded regions using a neural network, and training the neural network using a baseline reward component and a second reward component that balances the baseline reward component.

In other features, the method further comprises generating the second reward component by multiplying a sum of the importance scores of the filtered occluded regions a negative factor.

In other features, the method further comprises inputting features associated with the trajectory of the vehicle to a first plurality of neural networks to generate first outputs. The method further comprises inputting features associated with the filtered occluded regions to a second plurality of neural networks to generate second outputs. The method further comprises outputting the importance scores of the filtered occluded regions based on the first outputs and the second outputs.

In other features, the second plurality of neural networks is shared between the filtered occluded regions.

In other features, the second plurality of neural networks is different than the first plurality of neural networks.

In other features, the method further comprises filtering out one or more of the occluded regions from the map based on relevance of the occluded regions to the trajectory of the vehicle.

In other features, the method further comprises filtering out one or more of the occluded regions from the map based on route, state, and the trajectory of the vehicle; states of moving objects around the vehicle; predictions about the moving objects around the vehicle; and heuristics including the occluded regions that do not intersect the route of the vehicle, size and proximity of the occluded regions relative to the vehicle, and temporal evolution of the occluded regions and the moving objects around the vehicle.

In other features, the method further comprises computing the occluded regions based on data received from a mapping system identifying static objects including buildings and road configuration along a route of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
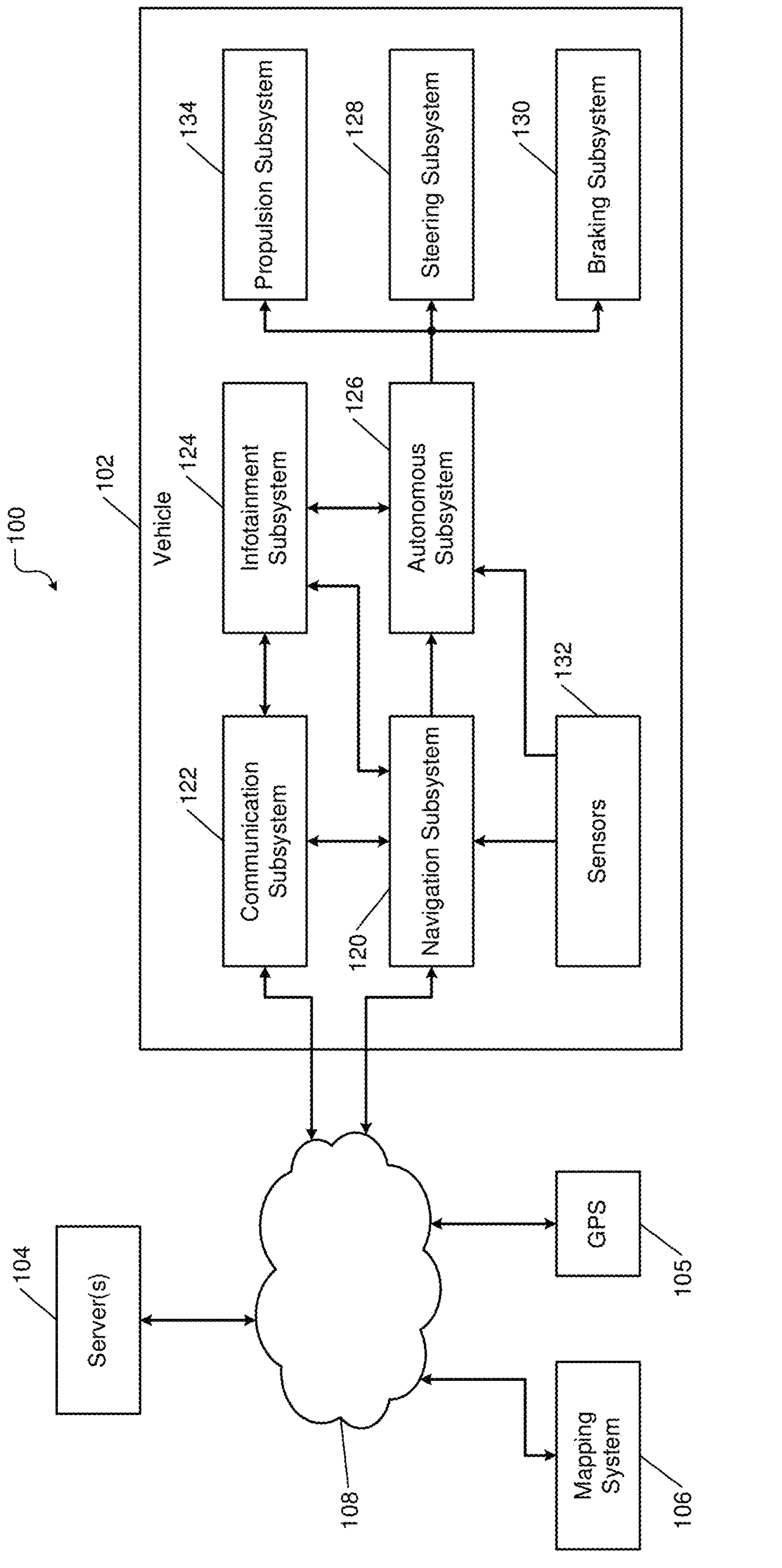
FIG. 1 shows an example of a system comprising a vehicle communicating with remote servers and systems.

Occlusions are ubiquitous in many driving scenarios. Motion planning subsystems (e.g., navigation subsystems) in autonomous and semi-autonomous vehicles (hereinafter "the vehicles") need to consider occlusions to modify trajectories of the vehicles. A trajectory is different than a motion plan or a route. A motion plan is a route that is a static element provided by a navigation subsystem on which a vehicle is driven from a source to a destination. A trajectory is a small portion or segment (i.e., a subset) of the motion plan that needs to be periodically updated depending on dynamically changing surroundings around the vehicle to adjust the movement (e.g., speed and steering) of the vehicle to propel the vehicle according to the motion plan. The present disclosure relates to periodically altering the trajectory of the vehicle depending on the dynamically changing surroundings around the vehicle.

Broadly speaking, the sensors onboard a vehicle such as cameras, radar, and Lidar sensors sense (perceive) the surroundings of the vehicle and provide sensed data about the surroundings of the vehicle to a navigation subsystem of the vehicle. The navigation subsystem generates a map of the surroundings of the vehicle based on the sensed data. The map is a snapshot of the surroundings of the vehicle. Due to various static obstacles such as buildings and dynamic obstacles such as other vehicles around the vehicle, pedestrians, cyclists, and so on, some regions of the map may be occluded. The number of unobserved or unobservable (i.e., occluded) regions on the map can rapidly increase with multiple occluding objects. For example, additional vehicles, pedestrians, objects such as cones and barricades used in road construction may appear in the map. The rapid increase in the number of occluded regions of the map increases computational demands on the motion planning subsystem.

The present disclosure provides a system and a method to alleviate the computational demands on the motion planning subsystem by determining which occluded regions are unimportant, filtering out the unimportant occlusions from the map, and assigning importance scores to the filtered occluded regions. A heuristic filter first removes unimportant occluded regions. A subsequent attention-based mechanism classifies the filtered occluded regions based on importance of the filtered occluded regions for the trajectory of the vehicle and assigning importance scores to the filtered occluded regions. The importance scores indicate how important (relevant) the occluded regions are to the trajectory of the vehicle. The motion planning subsystem then processes only the filtered occluded regions based on the importance scores assigned to the filtered occluded regions to modify the trajectory of the vehicle. The system and method of the present disclosure can be leveraged to enhance computation of both model-free and model-based planning, as well as to enhance computation of downstream tasks such as maneuvering the vehicle, providing notifications and warnings on a human-machine interface (HMI) of the vehicle, and so on.

The present disclosure is organized as follows. An example of a system comprising a vehicle communicating with remote servers and systems is shown and described with reference to FIG. 1. An example of a system for computing, filtering, and scoring occlusions around a vehicle for modifying trajectories of the vehicle is shown and described with reference to FIG. 2. Examples of occluded regions, filtered occluded regions, and scoring the filtered occluded regions around a vehicle are shown and described with reference to FIGS. 3 and 4. An example of a method for computing, filtering, and scoring occlusions around a vehicle for modifying trajectories of the vehicle is shown and described with reference to FIG. 5. An example of a method for filtering occlusions is shown and described with reference to FIG. 6. An example of a method for scoring occlusions is shown and described with reference to FIG. 7. An example of a method for training neural networks used in a scoring module to score occlusions is shown and described with reference to FIG. 8.

FIG. 1 shows a system 100 comprising a vehicle 102, one or more servers 104 (e.g., located in a cloud), a global positioning system (GPS) 105, and one or more mapping systems (hereinafter the mapping system) 106. The vehicle 102, the servers 104, the GPS 105, and the mapping system 106 communicate with each other via a distributed communication system 108. For example, the vehicle 102 can be an autonomous or a semi-autonomous vehicle that implements the system and method of the present disclosure. For example, the distributed communication system 108 may include one or more of a local area network (LAN), a wide area network (WAN), a cellular network, a WiFi network, and the Internet. For example, the servers 104 can process some of the data from the vehicle 102 and other vehicles (not shown in FIG. 1 but see examples shown in FIGS. 3 and 4). The servers 104 can provide information to the vehicle 102 to assist navigation and other subsystems of the vehicle 102 in driving of the vehicle 102.

The vehicle 102 comprises a navigation subsystem 120, a communication subsystem 122, an infotainment subsystem 124, an autonomous subsystem 126, a steering subsystem 128, a braking subsystem 130, a plurality of sensors 132, and a propulsion subsystem 134. The navigation subsystem 120 communicates with the server 104, the GPS 105, and the mapping system 106 via the distributed communication system 108. The navigation subsystem 120 may communicate with the GPS 105 directly or via the communication subsystem 122. The navigation subsystem 120 implements the system and method of the present disclosure as described below in detail with reference to FIG. 2 onwards.

The communication subsystem 122 may include one or more transceivers (e.g., a cellular transceiver, a WiFi transceiver, a GPS receiver, and a Bluetooth transceiver). The transceivers can communicate with the distributed communication system 108, the GPS 105, the servers 104, and a mobile device such as a cellular phone. The communication subsystem 122 may also communicate directly with the GPS 105. Further, the communication subsystem 122 may communicate with other vehicles (not shown) using vehicle-to-vehicle (V2V) communication technology.

The navigation subsystem 120 communicates with the infotainment subsystem 124. The infotainment subsystem 124 may comprise a display screen (e.g., a touch screen) and multimedia devices (e.g., a speaker and a microphone) for audiovisual interactions with occupants of the vehicle 102. The navigation subsystem 120 can provide maps and other audiovisual information to the occupants of the vehicle 102 via the infotainment subsystem 124. The navigation subsystem 120 can also receive audiovisual inputs from the occupants of the vehicle 102 via the infotainment subsystem 124. The navigation subsystem 120 can also receive inputs from the occupants of the vehicle 102 via a mobile device such as a cellular phone.

The navigation subsystem 120 receives data from the sensors 132. For example, the sensors 132 may include sensors that provide speed, heading, turn indication, and so on of the vehicle 102. The sensors 132 also include sensors such as cameras, radar, Lidar, and other sensors that are located on-board the vehicle 102 and that provide data about the surroundings of the vehicle 102. The navigation subsystem 120 also receives mapping data (e.g., map of the road, number of lanes, intersection, etc.) from the mapping system 106. The navigation subsystem 120 also receives GPS data (e.g., location information of the vehicle 102) from the GPS receiver in the communication subsystem 122 (or directly from the GPS 105). The navigation subsystem 120 also receives data about other vehicles from the servers 104. The navigation subsystem 120 adjusts the trajectory of the vehicle 102 based on all the data using the system and method of the present disclosure as described below in detail.

The autonomous subsystem 126 controls the operations of the vehicle 102 by controlling the steering subsystem 128, the braking subsystem 130, and the propulsion subsystem 134 based on the adjusted trajectory received from the navigation subsystem 120. For example, the propulsion subsystem 134 may comprise a motor (not shown) that propels the vehicle 102. The propulsion subsystem 134 may also comprise an engine (not shown) that works in conjunction with the motor to propel the vehicle 102. The autonomous subsystem 126 controls parameters of the motor and/or the engine according to the adjusted trajectory provided by the navigation subsystem 120.

Figure 2:
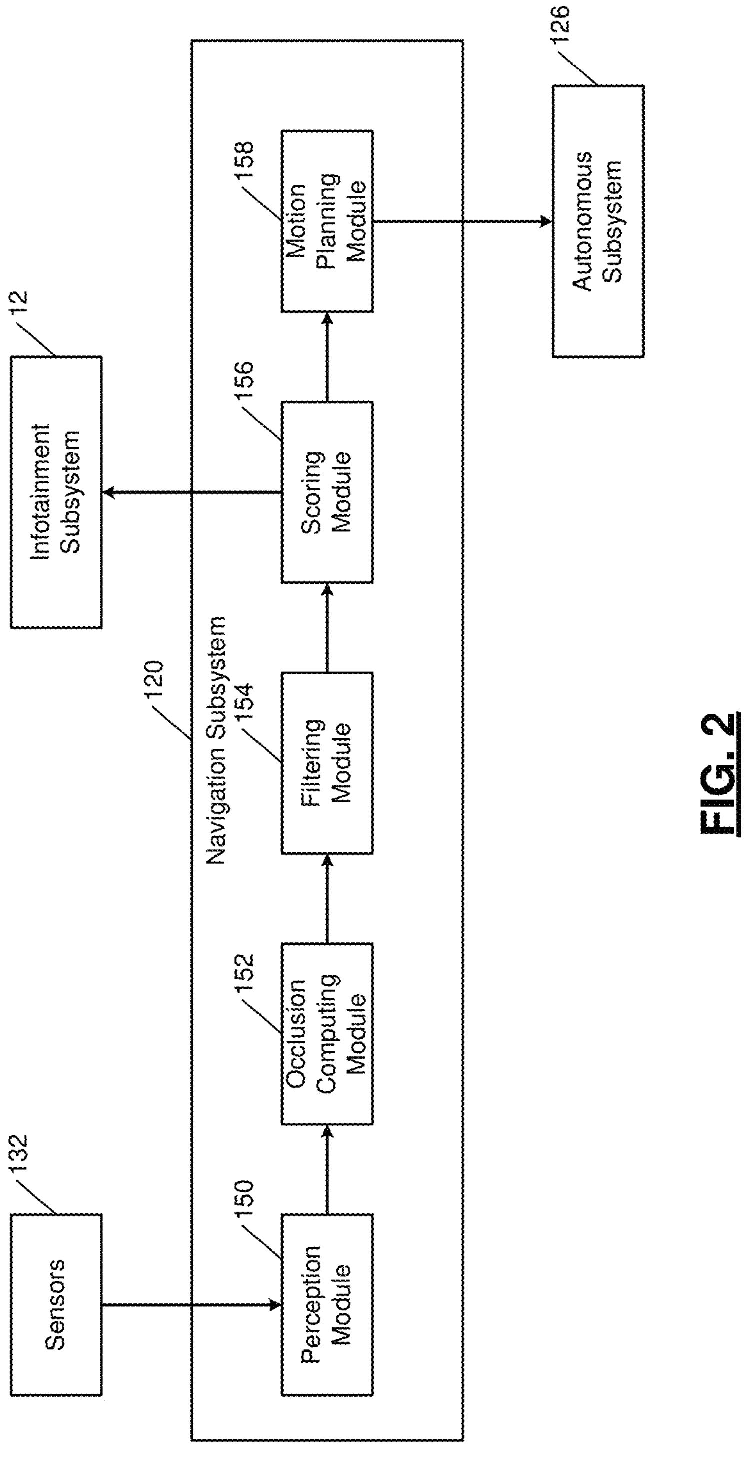
FIG. 2 shows an example of a system for computing, filtering, and scoring occlusions around a vehicle for modifying trajectories of the vehicle.

FIG. 2 shows an example of the navigation subsystem 120 for computing, filtering, and scoring occlusions around the vehicle 102 for modifying trajectories of the vehicle 102 according to the present disclosure. The navigation subsystem 120 comprises a perception module 150, an occlusion computing module 152, a filtering module 154, a scoring module 156, and a motion planning module 158. The modules are described below in detail.

The perception module 150 receives data about the surroundings of the vehicle 102 from the sensors 132, the mapping data from the mapping system 106, the GPS data from the GPS 105, and data about other vehicles from the servers 104. The perception module 150 generates a map (e.g., see FIG. 3, which is described below) of the surroundings of the vehicle 102, which is a snapshot of a scene around the vehicle 102. The perception module 150 can also be called a scene fusion module 150 since it uses information from different sensors and fuses (e.g., combines or consolidates) the scenes captured by the different sensors to generate the map.

Figure 3:
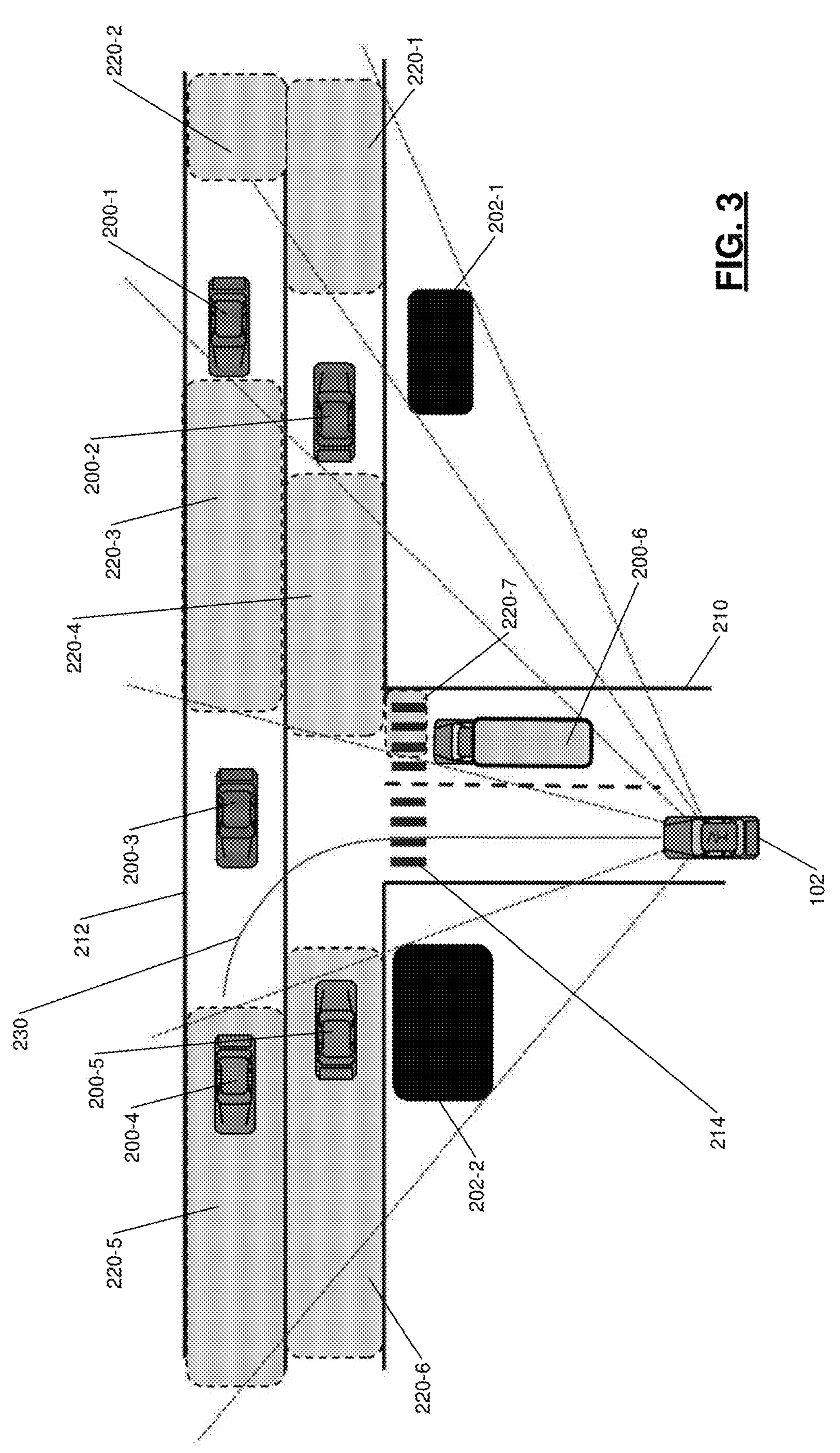
FIGS. 3 and 4 show examples of occluded regions, filtered occluded regions, and scoring the filtered occluded regions around a vehicle.

FIG. 3 shown an example of a map used to illustrate the system and the method for detecting, filtering, and scoring occlusions around the vehicle 102 for modifying trajectories of the vehicle 102 according to the present disclosure. The map shown in FIG. 3 is only an example. While the present disclosure is described with reference to a scene comprising an intersection shown in FIG. 3 as an example, the present disclosure is not so limited. Instead, the teachings of the present disclosure are applicable to any other scenario that vehicles can encounter while being driven anywhere (e.g., the vehicle 102 passing another vehicle, the vehicle 102 being passed by another vehicle, in parking lots and driveways, and so on).

In FIG. 2, the occlusion computing module 152 comprises an occlusion model that receives various inputs from the map of the surroundings of the vehicle 102 (e.g., the map shown in FIG. 3). For example, the inputs to the occlusion model in the occlusion computing module 152 include information about objects surrounding the vehicle 102 captured by the sensors 132 on-board the vehicle 102. The inputs include the state (e.g., speed, heading, and lane) of the vehicle 102 and states of various moving and stationary objects around the vehicle 102 such as other vehicles, buildings, and pedestrians around the vehicle 102. For example, in FIG. 3, the map shows the vehicle 102 and other vehicles 200-1, 200-2, 200-3, 200-4, 200-5, 200-6 (collectively called the other vehicles 200). For example, the map shows buildings 202-1, 202-2 (collectively called the buildings 202).

The inputs to the occlusion model in the occlusion computing module 152 include other information received from the mapping system 106 such as number of lanes, approaching intersection, and road signs (e.g., traffic lights, stop sign, one-way sign, etc.). For example, in FIG. 3, the map shows that the vehicle 102 is traveling in a left lane on a two-lane road 210 towards another two-lane road 212. At the intersection of the roads 210, 212, the map shows a pedestrian crossing 214.

Based on the inputs from the map and the perception module 150, the occlusion model in the occlusion computing module 152 identifies occluded regions in the map of the surroundings of the vehicle 102. For example, in FIG. 3, dashed lines are used to show lines of sight of the vehicle 102. Based on the lines of sight of the vehicle 102, the map shows occluded regions 220-1, 220-2, 220-3, 220-4, 220-5, 220-6, 220-7 (collectively called the occluded regions 220).

The filtering module 154 pre-processes the output of the occlusion model, which is the map of the surroundings of the vehicle 102 including the occluded regions 220 identified by the occlusion model in the occlusion computing module 152. The filtering module 154 filters unimportant occluded regions from the map of the surroundings of the vehicle 102 as follows.

The filtering module 154 performs the pre-processing for two reasons: first, to reduce the number of occluded regions to a maximum number of occlusions to track; and second, to eliminate computations for non-relevant occlusions. The filtering module 154 receives various inputs in addition to the output of the occlusion model, which is the map of the surroundings of the vehicle including the occluded regions identified by the occlusion model. For example, the additional inputs received by the filtering module 154 include the route, state, and current trajectory of the vehicle 102; the states of moving objects (e.g., vehicles 202 and pedestrians) around the vehicle 102, and predictions (e.g., from the servers 104) about movement of objects around the vehicle 102 (e.g., where the objects (e.g., the vehicles 200) will imminently be located relative to the vehicle 102 (e.g., in the next few seconds)).

The filtering module 154 filters out irrelevant (unimportant) occluded regions from the map based on heuristics. For example, the heuristics can include occlusions that do not intersect the route of the vehicle 102, the size of the occluded regions 220, and proximity (e.g., distance) of the occluded regions 220 from the vehicle 102. For example, the heuristics can include an occluded region that is relatively far from the vehicle 102 (e.g., the occluded regions 220-1, 220-2), which can be disregarded and filtered out from the map. In some examples, if all of the occluded regions 220 are deemed important (relevant) to the trajectory of the vehicle 102, none of the occluded regions 220 is filtered out. Accordingly, in general, the filtering module 154 may filter out none, or one or more of the occluded regions 220 from the map.

In other examples, the heuristics can include an occluded region caused by a stationary object such as a building that is past an intersection on a downstream portion of a one-way street on which the vehicle 102 is about to turn, which can be disregarded and filtered out. For example, the heuristics can include multiple occluded regions on the lane of the vehicle 102 that are in front and rear of the vehicle 102, where the farther ones of the multiple occluded regions can be filtered out. For example, the heuristics can include temporal evolution of occlusions and objects around the vehicle 102. For example, the filtering module 154 can filter out an occlusion ahead of the vehicle 102 in the same lane if there is a closer lead vehicle in the same lane. Filtering parameters used by the filtering module 154 can be adjusted based on the type of the vehicle 102 (e.g., a sedan, a pickup truck, a recreational vehicle (RV), etc.) and/or possible presence of a vulnerable road user (VRU) in the occluded regions 220.

Figure 4:
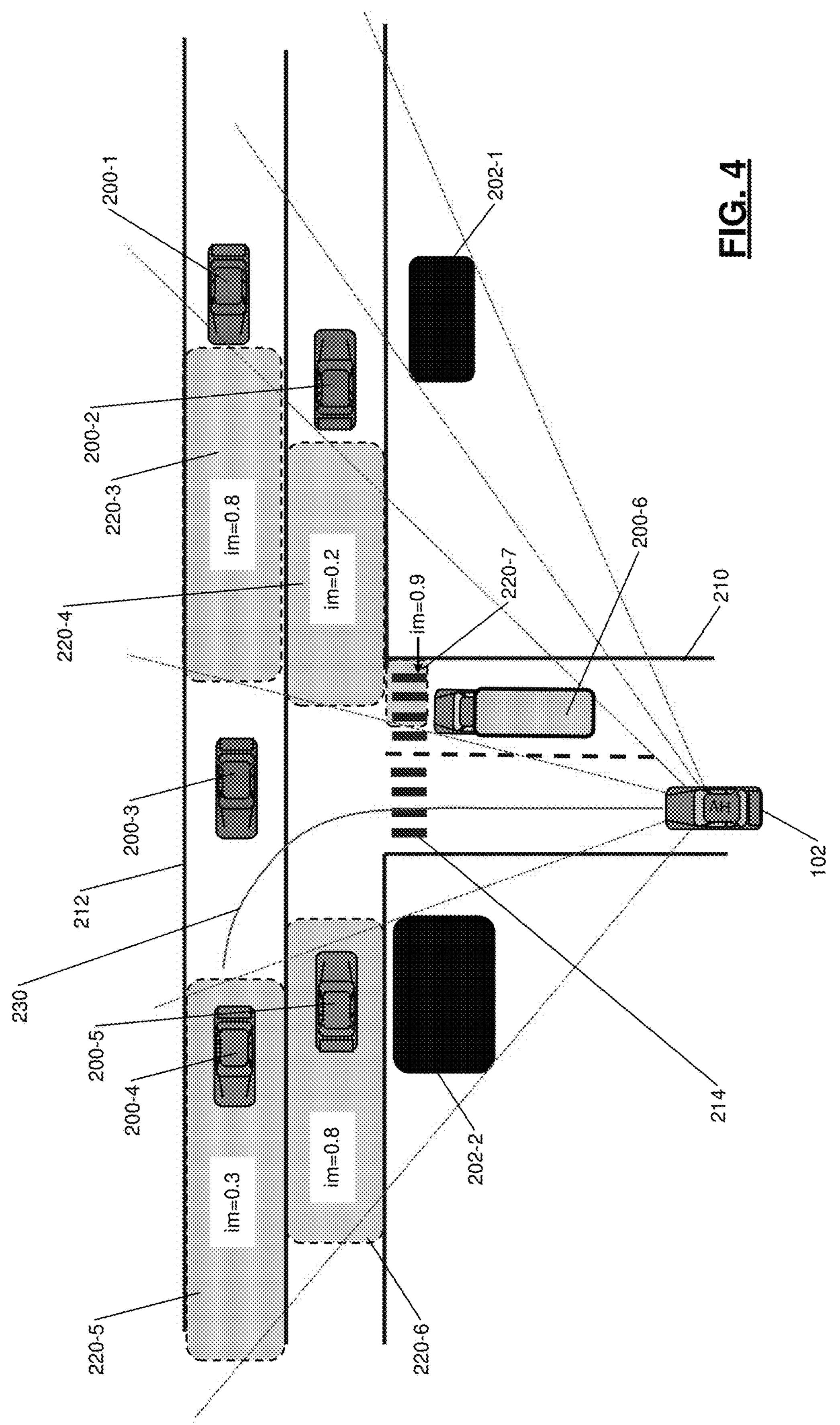

After the pre-processing (filtering) of the occluded regions 220 in the map, the filtering module 154 outputs a map with the filtered occluded regions. FIG. 4 shows an example of a map with the filtered occluded regions. In FIG. 4, the occluded regions 220-1, 220-2 shown in FIG. 3 are filtered out as explained above. Accordingly, the occluded regions 220-3 through 220-7, which remain in the map (i.e., which are not filtered out from the map) are called the filtered occluded regions. While not labeled as such in FIG. 4, to facilitate the following description, the filtered occluded regions 220-3 through 220-7 are called the filtered occluded regions 221. A method of filtering the occlusions is shown and described below with reference to FIG. 6.

The scoring module 156 scores the filtered occluded regions 221 in the map of the surroundings of the vehicle 102, which are output by the filtering module 154. The scoring module 156 scores the filtered occluded regions 221 to indicate the importance of each of the filtered occluded regions 221 that is material to the trajectory of the vehicle 102. For example, in FIGS. 3 and 4, an example of the trajectory of the vehicle 102 is shown at 230. The pre-processing (filtering) and scoring steps are performed before the motion planning module 158 processes the filtered occluded regions 221 according to the importance scores of the filtered occluded regions 221 to determine whether to change the trajectory 230 of the vehicle 102 as described below.

The scoring module 156 comprises a neural network called deep importance network for occlusions (DINO) that is trained to score the importance of the filtered occluded regions 221. The training methodology of the DINO is described below with reference to FIG. 8. The trained DINO utilizes an attention-based mechanism that receives input features about the trajectory 230 of the vehicle 102 and about the filtered occluded regions 221, which are described below with reference to FIG. 7. The trained DINO generates the importance scores for the filtered occluded regions 221 using the attention-based mechanism as described below with reference to FIG. 7. The motion planning module 158 can then change the trajectory 230 of the vehicle 102 based on the importance scores for the filtered occluded regions 221.

Before describing the operation of the scoring module 156 in detail with reference to FIG. 7 and the method for training the DINO in detail with reference to FIG. 8, an example of a method 250 performed by the navigation subsystem 120 of the vehicle 102 is shown and described with reference to FIG. 5. The following description of the method 250 briefly and broadly captures (summarizes) the operations performed by each module of the navigation subsystem 120 of the vehicle 102.

Figure 5:
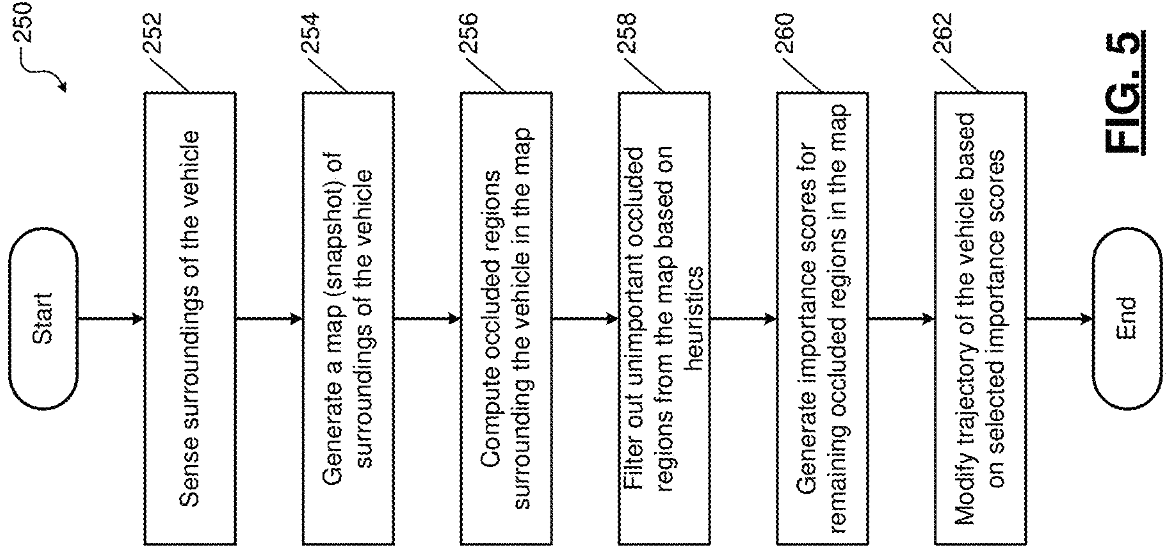
FIG. 5 shows an example of a method for computing, filtering, and scoring occlusions around a vehicle for modifying trajectories of the vehicle.

In FIG. 5, at 252, the method 250 (e.g., using the sensors 132 of the vehicle 102) senses the surroundings of the vehicle 102. At 254, the method 250 (e.g., using the perception module 150) generates a map (snapshot) of the surroundings of the vehicle 102. At 256, the method 250 (e.g., using the occlusion computing module 152) computes the occluded regions 220 in the map. At 258, the method 250

(e.g., using the filtering module 154) filters out unimportant occluded regions from the map based on heuristics. At 260, the method 250 (e.g., using the scoring module 156) generates importance scores for the filtered occluded regions 221. At 262, the method 250 (e.g., using the motion planning module 158) modifies the trajectory of the vehicle 102 based on selected importance scores.

Figure 6:
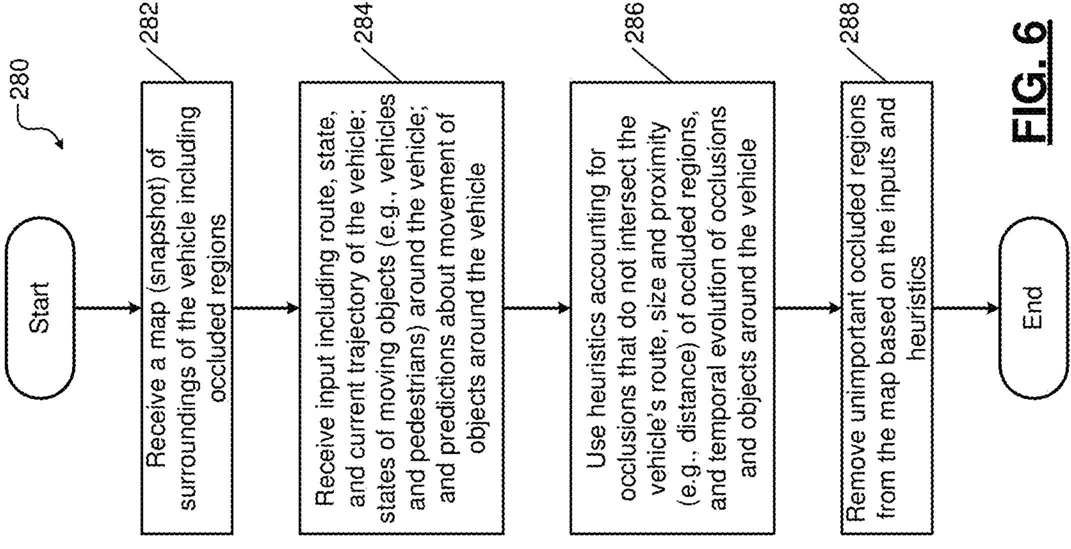
FIG. 6 shows an example of a method for filtering occlusions.

FIG. 6 shows a method 280 performed by the filtering module 154. The operations of the filtering module 154 are already described above in detail. In the following description of the method 280, the operations of the filtering module 154 are summarized. At 282, the filtering module 154 receives a map (snapshot) of the surroundings of the vehicle 102 including the occluded regions 220. At 284, the filtering module 154 receives inputs including route, state, and current trajectory of the vehicle 102; states of moving objects (e.g., the other vehicles 200, pedestrians, etc.) around the vehicle 102; and predictions about movement of the objects (e.g., the other vehicles 200) around the vehicle 102. At 286, the filtering module 154 leverages heuristics accounting for, e.g., occlusions that do not intersect the route of the vehicle 102, the size and proximity (e.g., distance) of the occluded regions 220 from the vehicle 102, and temporal evolution of the occlusions and the objects around the vehicle 102. For example, the heuristics are built into (e.g., coded in) the filtering module 154. At 288, the filtering module 154 filters out (i.e., removes) unimportant occluded regions from the map based on the inputs and heuristics and determines the filtered occluded regions 221 that are relevant to the trajectory of the vehicle 102.

Generally, the scene around the vehicle 102 (i.e., the map of the surroundings of the vehicle 102) can change dynamically. For example, the locations of the other vehicles 200 and correspondingly the occluded regions 220 can change as the vehicle 102, the other vehicles 200, and other objects such as cyclists and pedestrians continue to move. Accordingly, the process of detecting the occluded regions 220, determining the filtered occluded regions 221, calculating the importance scores of the filtered occluded regions 221, and changing the trajectory 230 of the vehicle 102 based on the importance scores can be repeated periodically (e.g., every second).

Further, the modification of the trajectory 230 of the vehicle 102 can generate alternate trajectories from which the autonomous subsystem 126 of the vehicle 102 can select a trajectory. For example, if a trajectory for the vehicle 102 is for turning left, the modified trajectory can be for executing the left turn differently (e.g., faster, slower, narrowly, widely) than planned in the original trajectory, or bringing the vehicle 102 to a complete stop. Thus, a change in trajectory can comprise alternate decisions.

Figures 7, 8:
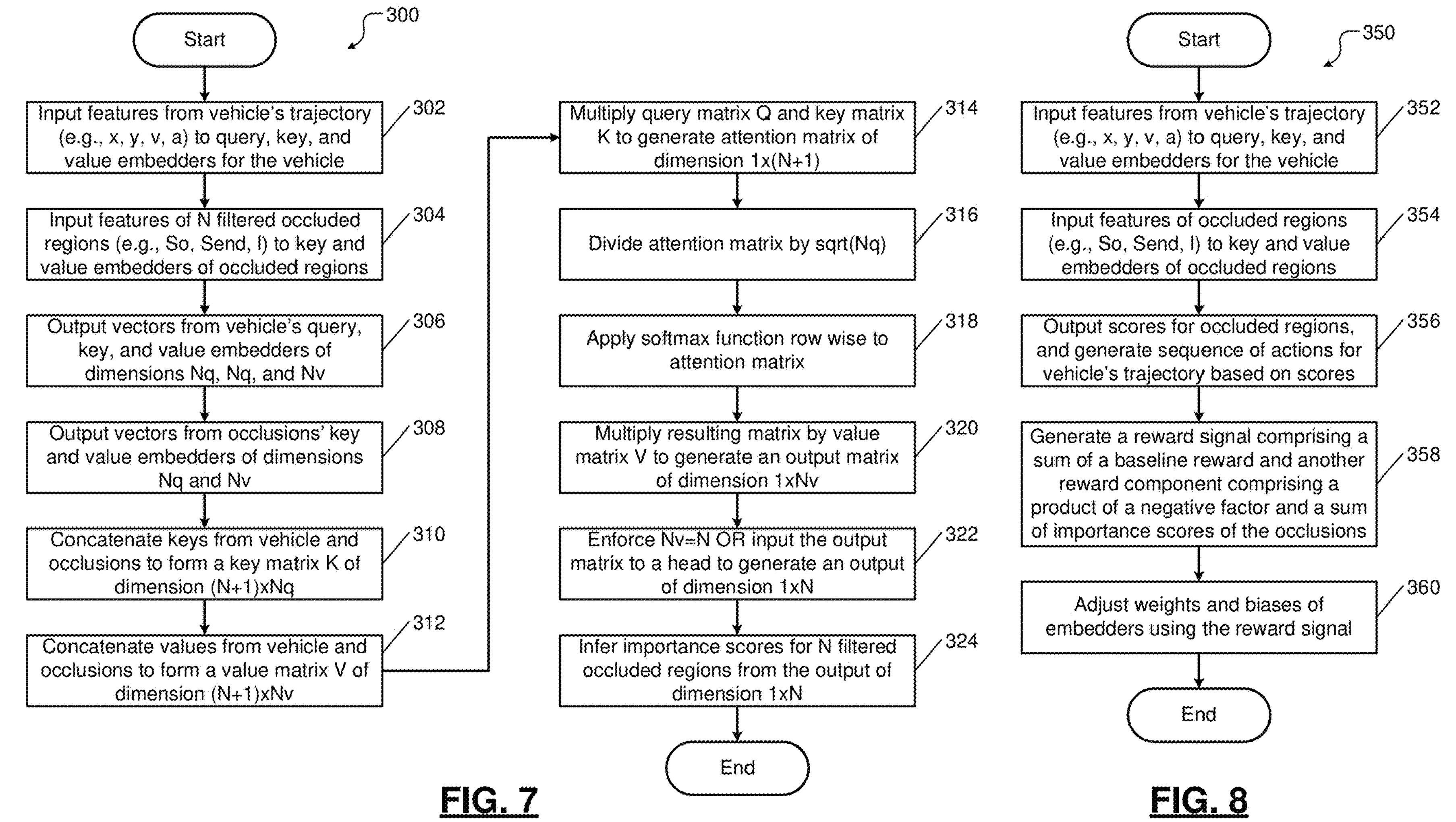
FIG. 7 shows an example of a method for scoring occlusions.
FIG. 8 shows an example of a method for training neural networks used in a scoring module of the system shown in FIG. 2 to score occlusions.

FIG. 7 shows a method 300 performed by the scoring module 156 in detail. The attention-based mechanism utilized by the trained DINO in the scoring module 156 receives specific inputs about the vehicle 102 and the filtered occluded regions 221 and generates the importance scores for the filtered occluded regions 221 as described below in detail.

For example, the DINO in the scoring module 156 comprises a plurality of embedders (e.g., neural networks) that receive the inputs as follows. For the vehicle 102, the DINO in the scoring module 156 comprises a query embedder, a key embedder, and a value embedder. For each of the filtered occluded regions 221, the DINO in the scoring module 156 comprises a key embedder and a value embedder. For the filtered occluded regions 221, the key embedder and the value embedder are shared by or between the filtered occluded regions 221. The key embedder and the value embedder for the vehicle 102 are different than the key embedder and the value embedder shared by the filtered occluded regions 221.

Further, the DINO in the scoring module 156 does not use a query embedder for the filtered occluded regions 221 since the relationships between the filtered occluded regions 221 are not relevant for scoring the filtered occluded regions 221. Rather, the spatial relationship of each of the filtered occluded regions 221 to the vehicle 102 is relevant for scoring the filtered occluded regions 221. Therefore, the DINO in the scoring module 156 uses a query embedder for the vehicle 102 but does not use a query embedder for the filtered occluded regions 221.

Accordingly, the DINO in the scoring module 156 can comprise five embedders: a query embedder, a key embedder, and a value embedder (3 embedders) for the vehicle 102, plus a key embedder and a value embedder (2 embedders) shared among the filtered occluded regions 221. For example, each of the five embedders can be a separate neural network. The neural networks of the DINO in the scoring module 156 receive features described below as inputs and generate vectors described below as outputs. For each neural network, the number of layers, the width of each layer, and associated activation functions are user-defined (i.e., selectable) parameters.

For example, let N denote a maximum number of filtered occluded regions 221 to be tracked, where N is an integer greater than 1, which is selectable. In the method 300 shown in FIG. 7, at 302, for the vehicle 102, the query embedder, the key embedder, and the value embedder receive input features extracted from the trajectory 230 of the vehicle 102. For example, the input features can comprise (x, y, v, a), where x and y are 2D coordinates, v is velocity, and a is acceleration of the vehicle 102.

At 304, for each of the filtered occluded regions 221, the key embedder and the value embedder shared between the filtered occluded regions 221 receive input features of the filtered occluded regions 221. For example, the input features of the filtered occluded regions 221 comprise ($s_0$, $s_{end}$, l), where $s_0$ and $s_{end}$ are the start and end points of longitudinal coordinates of the filtered occluded region 221, and l is information about the lane where the occlusion occurs.

At 306, the query embedder for the vehicle 102 generates an output vector of dimension $N_Q$. The key embedder for the vehicle 102 generates an output vector of dimension $N_Q$. The value embedder for the vehicle 102 generates an output vector of dimension $N_V$. At 308, the key embedder for the filtered occluded region 221 generates an output vector of dimension $N_Q$. The value embedder for the filtered occluded region 221 generates an output vector of dimension $N_V$.

Subsequently, in the DINO, the keys and values from the vehicle 102 and the filtered occluded regions 221 are concatenated. For example, at 310, the keys from the vehicle 102 and the keys from the filtered occluded regions 221 are concatenated to form a key matrix K of dimension $(N+1)\times N_Q$. At 312, the values from the vehicle 102 and the values from the filtered occluded regions 221 are concatenated to form a value matrix V of dimension $(N+1)\times N_V$.

At 314, a query matrix Q comprising the output of the query embedder for the vehicle 102 and the key matrix K comprising the outputs of the key embedders for the vehicle 102 and the filtered occluded regions 221 are multiplied to generate an attention matrix of dimension 1×(N+1). At 316, the attention matrix is divided by sqrt (No). At 318, a softmax operator is applied row-wise to the attention matrix; and at 320, a resulting matrix after application of the softmax operator is multiplied by the value matrix V comprising the outputs of the value embedders for the vehicle 102 and the filtered occluded regions 221 to generate an output matrix of the DINO having dimension $1 \times N_V$.

To use the output of the DINO to infer the importance scores for the filtered occluded regions 221, one of the following two approaches can be selected. A first approach enforces $N_V$=N. With the first approach, the output of the multiplication between the attention matrix and the value matrix is of the correct dimension (i.e., the maximum number of the occluded regions, N). In a second approach, another layer or a sequence of layers, called a head, can be added to the DINO. The head receives as input the $1 \times N_V$ vector (i.e., the result of the multiplication between the attention matrix and the value matrix) and generates an output of dimension 1×N. Again, as with the neural networks of the embedders, the structure of the head (number of layers, width of layers and activation function) can be user-defined (i.e., selectable). Accordingly, at 322, either $N_V$=N is enforced or the output matrix of the DINO is input to a head to generate an output of dimension 1×N. At 324, the importance scores for the N filtered occluded regions 221 are inferred from the output of dimension 1×N.

Subsequently, the motion planning module 158 can select the filtered occluded regions 221 with importance scores greater than or equal to a selectable threshold and disregard the filtered occluded regions with importance scores less than the selectable threshold. The motion planning module 158 processes only the selected ones of the filtered occluded regions 221, which reduces the computational load of the motion planning module 158, and can change the trajectory 230 of the vehicle 102 based on the selected ones of the filtered occluded regions 221. Alternatively or additionally, the motion planning module 158 can process only the selected ones of the filtered occluded regions 221 and generate one or more alternate trajectories for the vehicle 102 based on the selected ones of the filtered occluded regions 221.

FIG. 8 shows a method 350 for training the DINO that is used in the scoring module 156 in detail. For example, the DINO in the scoring module 156 is trained using reinforcement learning as follows. During training, the embedders (neural networks) of the DINO receive the input features about the trajectory of the vehicle 102 and the occluded regions 220 as described above. For example, at 352, for the vehicle 102, the query embedder, the key embedder, and the value embedder receive input features extracted from the trajectory of the vehicle 102. For example, the input features can comprise (x, y, v, a), where x and y are 2D coordinates, v is velocity, and a is acceleration of the vehicle 102. At 354, for example, the key embedder and the value embedder shared between the occluded regions 220 receive input features of the occluded regions 220. For example, the input features of the occluded regions 220 comprise ($s_0$, $s_{end}$, l), where $s_0$ and $s_{end}$ are the start and end points of longitudinal coordinates of the filtered occluded region 221, and l is information about the lane where the occlusion occurs.

At 356, the DINO in the scoring module 156 generates an output comprising the importance scores for the occluded regions 220. Based on the importance sores generated by the DINO, the motion planning module 158 generates a sequence of actions (e.g., speed, acceleration, lane change, turn, etc.) for the trajectory of the vehicle 102.

At 358, the DINO is trained using a reward comprising two components. The reward comprising the two components is used to adjust weights and biases of the neural networks in the DINO. The two components balance each other such that the net reward does not increase the computational load on the motion planning module 158 and also does not compromise the comfort, safety, and speed of the vehicle 102 as follows.

A first component of the reward signal is a baseline reward generated by the motion planning module 158. The motion planning module 158 generates the first component based on factors such as how fast can the vehicle 102 complete the trajectory, how much comfort (e.g., jerk) can the trajectory generate as the vehicle 102 completes the trajectory, and how safely can the vehicle 102 complete the trajectory. The motion planning module 158 can generate the first component by optimizing one or more of these factors. For example, the motion planning module 158 may emphasize one factor (e.g., comfort) while de-emphasizing another factor (e.g., speed). For example, the motion planning module 158 can use an equation or a formula to maximize the baseline reward so that the vehicle 102 can execute the trajectory at a speed with maximum comfort and safety.

In some examples, if only the baseline reward component is used to train the DINO, the number of occluded regions detected as being important can increase, which in turn increases the computational load on the motion planning module 158. Therefore, the present disclosure adds a second reward component to the training signal used to train the DINO. The second reward component balances or offsets the baseline reward component as follows.

For example, the second reward component can be generated by summing the importance scores of the occluded regions, multiplying the sum of the importance scores by a negative coefficient, and adding the negative product to the first baseline reward component. Alternatively, the second reward component can be generated by selecting only those importance scores that are greater than a selected threshold. For example, the importance scores for occluding regions with high importance scores due to a pedestrian barging into the road, due to an oncoming vehicle such as an emergency vehicle approaching the vehicle 102, and so on can be selected. The second reward component can then be generated by summing the selected high importance scores, multiplying the sum by a negative coefficient, and adding the negative product to the first baseline reward component. The second reward component reduces the first reward component so that the DINO is not disproportionately biased to maximize factors such as comfort, safety, and speed of the vehicle 102 in the baseline reward.

Accordingly, at 358, the reward signal used to train the DINO comprises a sum of the baseline reward component and another reward component comprising a product of a negative factor and a sum of importance scores of the occluded regions. At 360, the weights and biases of the five embedders (neural networks) are adjusted using the learning signal coming from the reward. The adjustments are continued until the DINO is trained. For example, the training stops when the user decides to stop the training based on different metrics such as number of updates to the weights and biases of the neural networks. The trained DINO is then used in the scoring module 156 of the navigation subsystem 120 of the vehicle 102 as described above.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, subsystems, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "controller," or the term "subsystem" may be replaced with the term "circuit." The term "module" or the term "subsystem" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or subsystem may include one or more interface circuits. In some examples, the interface circuits may include wired or wireless interfaces that are connected to a local area network (LAN), the Internet, a wide area network (WAN), or combinations thereof. The functionality of any given module or subsystem of the present disclosure may be distributed among multiple modules or subsystems that are connected via interface circuits. For example, multiple modules or subsystems may allow load balancing. In a further example, a server (also known as remote server or cloud) may accomplish some functionality on behalf of a client module or subsystem.

The term code, as used above, may include software, firmware, and/or microcode, and may refer to programs, routines, functions, classes, data structures, and/or objects. The term shared processor circuit encompasses a single processor circuit that executes some or all code from multiple modules or subsystems. The term group processor circuit encompasses a processor circuit that, in combination with additional processor circuits, executes some or all code from one or more modules or subsystems. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or subsystems. The term group memory circuit encompasses a memory circuit that, in combination with additional memories, stores some or all code from one or more modules or subsystems.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A system for a vehicle comprising:

a plurality of sensors configured to sense surroundings of the vehicle;

a perception module configured to generate a map of the surroundings of the vehicle, the map comprising objects around the vehicle;

an occlusion computing module configured to compute occluded regions in the map, the occluded regions being regions around the vehicle that are occluded by one or more of the objects around the vehicle;

a filtering module configured to filter out none, or one or more of the occluded regions from the map, the map comprising a plurality of filtered occluded regions after the filtering;

a scoring module configured to score the filtered occluded regions based on importance of the filtered occluded regions to a trajectory of the vehicle, wherein the scoring module comprises a neural network configured to score the filtered occluded regions, wherein the neural network is trained using a baseline reward component and a second reward component that balances the baseline reward component, and wherein the second reward component comprises a product of a negative factor and a sum of the importance scores of the filtered occluded regions;

a motion planning module configured to modify the trajectory of the vehicle based on importance scores of the filtered occluded regions; and a propulsion module configured to propel the vehicle according to the modified trajectory.

2. The system of claim 1 wherein the motion planning module is configured to:

select one or more of the filtered occluded regions having importance scores greater than or equal to a threshold; and modify the trajectory of the vehicle based on the selected filtered occluded regions.

3. The system of claim 1 wherein the scoring module comprises:

a first plurality of neural networks configured to receive features associated with the trajectory of the vehicle as inputs and to generate first outputs; and a second plurality of neural networks configured to receive features associated with the filtered occluded regions and to generate second outputs, wherein the scoring module is configured to output the importance scores of the filtered occluded regions based on the first outputs and the second outputs.

4. The system of claim 3 wherein the second plurality of neural networks is shared between the filtered occluded regions.

5. The system of claim 3 wherein the second plurality of neural networks is different than the first plurality of neural networks.

6. The system of claim 1 wherein the filtering module is configured to filter out one or more of the occluded regions from the map based on relevance of the occluded regions to the trajectory of the vehicle.

7. The system of claim 1 wherein the filtering module is configured to filter out none, or one or more of the occluded regions from the map based on route, state, and the trajectory of the vehicle; states of moving objects around the vehicle; predictions about the moving objects around the vehicle; and heuristics including the occluded regions that do not intersect the route of the vehicle, size and proximity of the occluded regions relative to the vehicle, and temporal evolution of the occluded regions and the moving objects around the vehicle.

8. The system of claim 1 wherein the occlusion computing module is configured to compute the occluded regions based on data received from a mapping system identifying static objects including buildings and road configuration along a route of the vehicle.

9. A method for a vehicle comprising:

sensing surroundings of the vehicle;

generating a map of the surroundings of the vehicle, the map comprising objects around the vehicle;

computing occluded regions in the map, the occluded regions being regions around the vehicle that are occluded by one or more of the objects around the vehicle;

filtering out one or more of the occluded regions from the map based on route, state, and a trajectory of the vehicle; states of moving objects around the vehicle; predictions about the moving objects around the vehicle; and heuristics including the occluded regions that do not intersect the route of the vehicle, size and proximity of the occluded regions relative to the vehicle, and temporal evolution of the occluded regions and the moving objects around the vehicle, the map comprising a plurality of filtered occluded regions after the filtering;

scoring the filtered occluded regions based on importance of the filtered occluded regions to the trajectory of the vehicle;

modifying the trajectory of the vehicle based on importance scores of the filtered occluded regions; and propelling the vehicle according to the modified trajectory.

10. The method of claim 9 further comprising:

selecting one or more of the filtered occluded regions having importance scores greater than or equal to a threshold; and modifying the trajectory of the vehicle based on the selected filtered occluded regions.

11. The method of claim 9 further comprising:

scoring the filtered occluded regions using a neural network; and training the neural network using a baseline reward component and a second reward component that balances the baseline reward component.

12. The method of claim 11 further comprising generating the second reward component by multiplying a sum of the importance scores of the filtered occluded regions a negative factor.

13. The method of claim 11 further comprising:

inputting features associated with the trajectory of the vehicle to a first plurality of neural networks to generate first outputs;

inputting features associated with the filtered occluded regions to a second plurality of neural networks to generate second outputs; and outputting the importance scores of the filtered occluded regions based on the first outputs and the second outputs.

14. The method of claim 13 wherein the second plurality of neural networks is shared between the filtered occluded regions.

15. The method of claim 13 wherein the second plurality of neural networks is different than the first plurality of neural networks.

16. The method of claim 9 further comprising filtering out one or more of the occluded regions from the map based on relevance of the occluded regions to the trajectory of the vehicle.

17. The method of claim 9 further comprising computing the occluded regions based on data received from a mapping system identifying static objects including buildings and road configuration along a route of the vehicle.

18. A computer program product comprising processor-executable instructions stored on a non-transitory tangible computer-readable medium, wherein the instructions when executed by a processor configure the processor to:

sense surroundings of a vehicle;

generate a map of the surroundings of the vehicle, the map comprising objects around the vehicle;

compute occluded regions in the map, the occluded regions being regions around the vehicle that are occluded by one or more of the objects around the vehicle;

filter out one or more of the occluded regions from the map based on route, state, and a trajectory of the vehicle; states of moving objects around the vehicle; predictions about the moving objects around the vehicle; and heuristics including the occluded regions that do not intersect the route of the vehicle, size and proximity of the occluded regions relative to the vehicle, and temporal evolution of the occluded regions and the moving objects around the vehicle, the map comprising a plurality of filtered occluded regions after the filtering;

score the filtered occluded regions using a neural network based on importance of the filtered occluded regions to the trajectory of the vehicle;

train the neural network using a baseline reward component and a second reward component that balances the baseline reward component;

generate the second reward component by multiplying a sum of the importance scores of the filtered occluded regions a negative factor;

modify the trajectory of the vehicle based on importance scores of the filtered occluded regions; and propel the vehicle according to the modified trajectory.

19. The computer program product of claim 18 wherein the instructions further configure the processor to:

input features associated with the trajectory of the vehicle to a first plurality of neural networks to generate first outputs;

input features associated with the filtered occluded regions to a second plurality of neural networks to generate second outputs, wherein the second plurality of neural networks is shared between the filtered occluded regions; and output the importance scores of the filtered occluded regions based on the first outputs and the second outputs.

20. The computer program product of claim 18 wherein the instructions further configure the processor to:

compute the occluded regions based on data received from a mapping system identifying static objects including buildings and road configuration along a route of the vehicle; and filter out one or more of the occluded regions from the map based on relevance of the occluded regions to the trajectory of the vehicle.

* * * * *